United States Patent

[11] 3,547,377

| [72] | Inventor | Peter J. Frey |
| | | 1560 Asylum Ave., West Hartford, Conn. 06117 |
| [21] | Appl. No. | 716,940 |
| [22] | Filed | March 28, 1968 |
| [45] | Patented | Dec. 15, 1970 |

[54] COUNTERFLOW JET FLAP HELICOPTER
11 Claims, 10 Drawing Figs.

[52] U.S. Cl. .................................................... 244/17.25;
                                                             416/91
[51] Int. Cl. ...................................................... B64c 27/72
[50] Field of Search ............................................ 170/135.4,
    135.71, 172, 160.31, 160.13; 244/42.48, 42.41,
    42.47, 17.21; 244/17.11, 17.25, 17.13; 416/91

[56] References Cited
UNITED STATES PATENTS

| 2,498,283 | 2/1950 | Lee | 170/135.4 |
| 2,925,129 | 2/1960 | Yuan et al. | 170/135.4 |
| 2,936,971 | 5/1960 | Holmes | 244/17.21 |
| 3,062,483 | 11/1962 | Davidson | 244/42 |
| 3,149,805 | 9/1964 | Frey et al. | 244/42 |
| 3,288,225 | 11/1966 | Flint et al. | 170/135.4 |
| 3,348,618 | 10/1967 | Flint et al. | 170/135.4 |
| 3,349,853 | 10/1967 | Flint et al. | 170/135.4 |

Primary Examiner—Trygve M. Blix
Assistant Examiner—Paul E. Sauberer
Attorney—Fishman and VanKirk ABSTRACT: The main rotor blades of a helicopter craft are equipped with cooperating counterflow jet flaps and ejector-type jet pumps. Compressed air is delivered to the jet pumps in the rotors whereby airflow is generated in ejector fashion through the jet flap system to produce substantial amounts of additional lift. A control system programs the operation of the jet pumps to provide collective pitch and/or cyclic pitch control for the rotor blades so that a rigid rotor structure can be effectively employed.

3,547,377

COUNTERFLOW JET FLAP HELICOPTER

BACKGROUND OF THE INVENTION

1. Field of the Invention

This invention relates to helicopter aircraft. More particularly, this invention relates to helicopter aircraft in which substantial amounts of lift are generated through the action of ejector type pumps and counterflow jet flaps in the main rotors. This invention is particularly applicable to, but not limited to, a helicopter in which the main rotor is positioned below the aircraft center of gravity and/or in which a rigid rotor system is employed.

2. Description of the Prior Art

Numerous attempts have been made in the past both to simplify helicopter construction and operation and to provide a practicable small helicopter for private use. However, such goals have not been attainable for a variety of reasons among which have been high cost of operation, necessary elaborate and complex rotor head construction and blade control, and high cost of operation. A significant advance has recently been made in the development of the so-called "rigid rotor", reference being made to U.S. Pat. No. 3,106,964 for an example thereof, but the problems have persisted.

SUMMARY OF THE INVENTION

In the present invention the main rotor blades of a helicopter are equipped with ejector type jet pumps and counterflow jet flaps. The jet pump and jet flap system operates on the rotor blades to provide substantial amounts of vertical lift for the helicopter. Examples of jet pump and counterflow jet flap systems in fixed winged aircraft can be seen in U.S. Pat. No. 3,149,805 in which the present inventor is a coinventor and in Pat. application Ser. No. 628,673 for Counterflow Jet Flap by the present inventor. With the expenditure of about 5 percent of rotor horsepower to supply compressed air to generate lift through the jet pump and counterflow jet flap system on the rotor blades, the blade loading can be about doubled. This means that there can be either a reduction in rotor solidity (blade area to disc area ratio) or a reduction in tip speed or a combination of both. A preferred mode of operation would be to keep a conventional rotor solidity but reduce the tip speed by about 200 feet per second so as to bring the tip speed below 500 feet per second thereby resulting in a significant and substantial reduction of rotor noise.

The rotor blades are positioned at their juncture, i.e. at their connection to the hub, without an angle of attack and without any twist in order to eliminate torsional stresses caused by the centrifugal force field. The characteristics of the counterflow jet flap system itself will produce an effective aerodynamic twist and an effective second harmonic cyclic lift variation due to unusually high sensitivity to dynamic pressure because counterflow jet flap air can be pumped more efficiently against the low dynamic pressure near the hub and the retreating side of the blade. The system also produces positive lift in the reverse flow region even with negative angles of attack. Thus, an ideal loading of the blades is achieved and control inputs are minimized. The profile of the blades may be slightly cambered to produce the proper lift for autorotation.

Collective pitch control and cyclic pitch control for the blades, and pitch and roll control for the craft are accomplished by the programming of solenoid operated pneumatic valves which control the flow of jet pump air to the jet pumps in the rotor blades. As previously indicated, an effective second harmonic cycle of blade load is inherently present in the system, and further cyclic inputs, either arbitrary or harmonic, can be programmed in forward flight to load the rotor ideally around the azimuth, especially fore-and-aft, thereby effecting a speed increase of about 30 percent. The usually massive and complicated rotor head is eliminated thereby drastically reducing the parasite drag usually connected therewith so that the higher rotor speeds can be obtained without an increase in rotor horsepower.

Accordingly, one object of the present invention is to provide a novel and improved helicopter construction.

Another object of the present invention is to provide a novel and improved rotor construction for a helicopter craft.

Still another object of the present invention is to provide a novel and improved rotor construction for a helicopter craft in which a counterflow jet flap system is employed in the rotor structure.

Still another object of the present invention is to provide a novel and improved helicopter rotor construction in which collective pitch and cyclic pitch control are accomplished pneumatically by variations in pressure loading on the blades rather than by pivoting or flexing motion of the blades.

Still another object of the present invention is to provide a novel helicopter rotor construction in which rotor head size is minimized.

Still another object of the present invention is to provide a novel helicopter rotor structure having an improved rigid rotor configuration.

Still another object of the present invention is to provide a novel helicopter craft in which the main rotor is positioned below the body of the craft.

Other objects and advantages will be apparent and understood by the following detailed description and drawings.

DESCRIPTION OF THE DRAWINGS

In the drawings, wherein like elements are numbered alike in the several FIGS.;

FIG. 3 is a view showing structure for delivering compressed air to the rotor jet pumps.

FIG. 4 is a view taken along line 4–4 of FIG. 3.

DESCRIPTION OF THE PREFERRED EMBODIMENT

Figure 1:
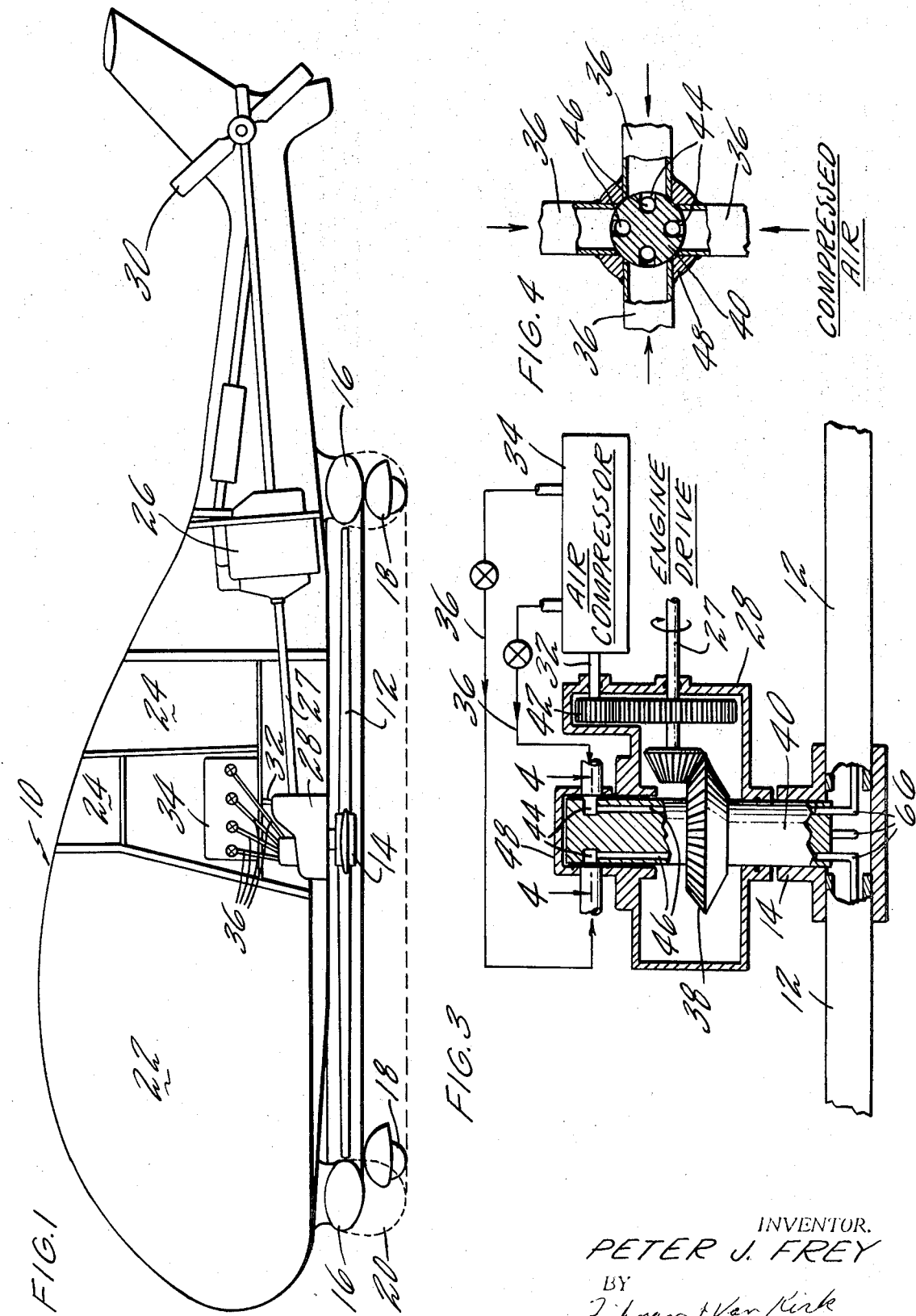
FIG. 1 is an elevation view of a helicopter craft in accordance with the present invention.
Figure 2:
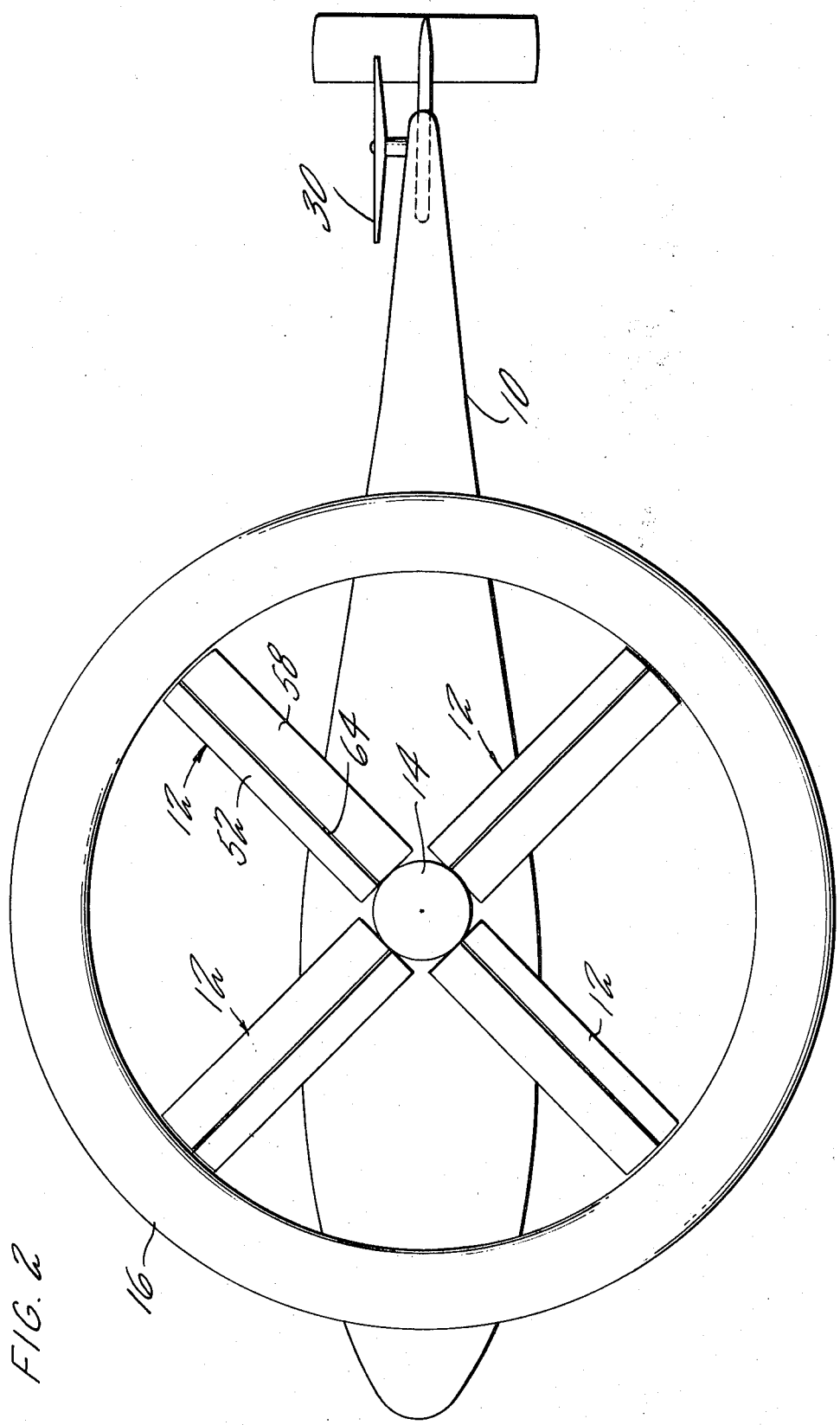
FIG. 2 is a bottom plan view of the craft of FIG. 1, i.e. as viewed from below the craft of FIG. 1.

Referring now to FIGS. 1 and 2, a helicopter 10 has four rotor blades 12 positioned below the helicopter. The blades are directly connected to a small hub 14 which is in turn drivingly connected to the helicopter power plant. A toroidal shroud 16 surrounds the outer periphery of the blades to provide protection and prevent a person from inadvertently coming within the path of the blades when the craft is at or near the ground and serves as a flotation device for emergency water landings. Wheels 18 are provided for normal ground landing and takeoff, and shroud 16 may have an inflatable rubber boot 20 attached thereto to enable air-cushioned landings and takeoffs on land or water. Boot 20 is shown in dotted line in FIG. 1 to illustrate its inflated position.

The forward compartment 22 of helicopter 10 provides pilot and passenger space, and spaces such as compartment 24 may house fuel tanks. An engine 26, which is preferably a lightweight turboshaft engine such as the Continental T63 or T65, is connected in standard fashion through a drive shaft 27 to a main rotor gear box 28 and also to a tail rotor 30. Gear box 28 is connected to drive main rotor hub 14, and gear box 28 is also connected, via rotating shaft 32 to drive an air compressor 34.

Air compressor 34 has a plurality of air supply lines 36 leading from the compressor to provide air supplies for jet pumps positioned in the rotor blades. Four of the air supply lines 36 are shown in FIG. 1, but it will be understood that the number of air supply lines does not necessarily have to equal the number of rotor blades in the helicopter rotor head. The compressed air delivered via supply lines 36 is used to provide counterflow jet flap helicopter rotor operation in accordance with the present invention. It will, of course, be understood that the compressed air supply could come from other sources such as an engine compressor bleed or an auxiliary pressurized bottle which could be an emergency source.

Referring now to FIG. 3, some of the details of the gear box and compressed air supply structure are shown. Engine drive shaft 27 is connected via gear train 38 to drive a rotatably mounted rotor shaft 40, rotor hub 14 being fixed to one end of shaft 40. Engine drive shaft 27 is also connected via another gear train 42 to shaft 32 and air compressor 34, and the supply lines 36 are connected to deliver compressed air to rotating passages in rotor shaft 40. The end of rotor shaft 40 removed from hub 14 is provided with a plurality of connecting inlets 44, and passageways 46 lead from each of the inlets 44 to separate rotor blades where they are permanently connected to the jet pumps in the respective rotor blades. The air from compressor 34 is delivered via supply lines 36 to the inlets 44 and thence via passages 46 to the jet pumps in each of the rotor blades. Although FIG. 3 shows only two supply lines 36, two inlets 44 and two passages 46, it will be understood that this structure is repeated for each rotor blade so that the number of supply lines 36, inlets 44 and passages 46 is equal to the number of rotor blades. The supply lines 36 connect to a casing 48 within which the upper part of rotor shaft 40 rotates, and appropriate sealing is provided to prevent leakage of air between rotor shaft 40 and casing 48.

Referring now to FIG. 4, a view is shown taken along line 4—4 of FIG. 3. The supply lines 36 are connected to casing 48 at points space 90° apart, and the inlets 44 and passages 46 in shaft 40 are also spaced 90° apart. In this manner, each passage 46 is serially connected to each of the supply lines during each rotation of shaft 40 for delivery of the compressed air (indicated by the arrows) to the rotor blade mounted jet pumps. The relative size of the supply lines 36 at casing 48 and the inlets 44 is such that a passage 46 is immediately connected to the next succeeding supply line in the series upon being disconnected from a supply line so that there is no interruption in the delivery of jet pump air to the blades.

Figure 5:
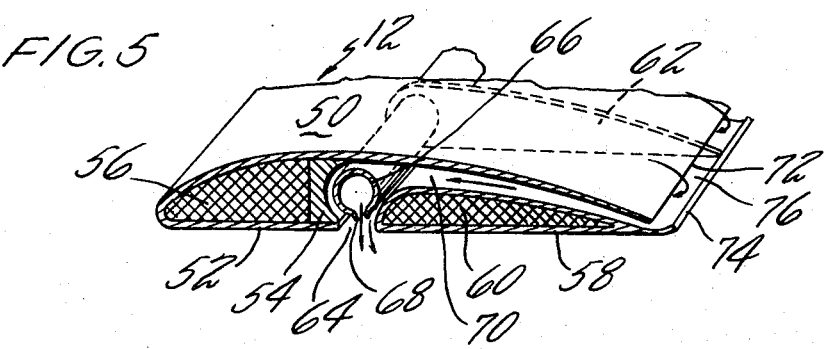
FIG. 5 is a sectional perspective view of a segment of a rotor blade showing the preferred jet flap construction.

Referring now to FIG. 5, a preferred arrangement is shown for the jet flap rotor construction for each of the rotor blades. The rotor blade 12 may have a standard blade profile, e.g. NACA 65A212, which may be slightly cambered to provide the proper lift in autorotation. The entire upper surface 50 of the blade and the leading portion 52 of the lower surface may be a one piece stainless steel or aluminum skin connected to main spar 54, and the space between the upper and lower surfaces of the leading edge may be filled with a honeycomb 56 bonded to the interior surface of the skin and to the spar to provide structural rigidity. The bottom side 58 of the trailing part of the blade may also be a hollow one piece aluminum or plastic structure filled with a honeycomb bonded to the interior surface. Ribs 62 (only one of which is shown for purposes of illustration) extend rearwardly from main spar 54, and both the upper surface 50 and lower surface 58 and honeycomb 60 are attached to the ribs.

The bottom portion 58 of the trailing part of the blade is separated from bottom portion 52 of the leading part by a longitudinal opening 64 which extends along the entire length of the bottom surface of the rotor blade (see also FIG. 2). A jet pump 66 constituting a tube extending longitudinally along the length of the blade and having an appropriately shaped longitudinal nozzle 68 is positioned adjacent opening 64 with jet pump nozzle 68 communicating with the atmosphere through opening 64. The blade also has a spacing 70 between the upper surface 50 and the bottom portion 58 of the blade, and spacing 70 extends longitudinally along the length of the blade. The trailing edge 72 of the upper surface of the blade ends short of the trailing edge 74 of the lower part to define a longitudinally extending opening 76 at the rear upper portion of the blade. Opening 76 leads directly to space 70, and space 70 is in direct communication with space 64. As will be explained in more detail hereinafter, compressed air delivered to the jet pump 66 is discharged to atmosphere through nozzle 68 and creates a jet pump or ejector action whereby relatively large amounts of air is drawn through opening 76 and flows through space 70 and is discharged downwardly through space 64 to provide lift for the rotor blades.

Figure 6:
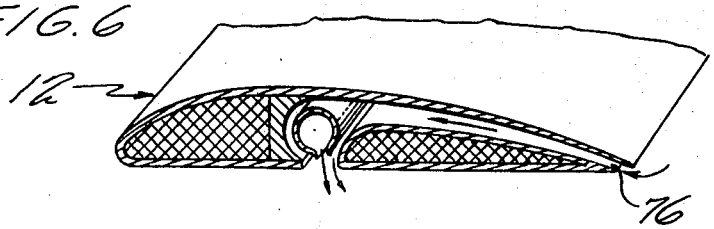
FIG. 6 is a view similar to FIG. 5 showing an alternative jet flap construction.

Referring now to FIG. 6, an alternative construction for the rotor blade is shown. The blade of FIG. 6 differs from the blade of FIG. 5 only in that the upper and lower surfaces are arranged so that opening 76 is at the bottom side of the blade rather than at the top side of the blade.

Figure 7:
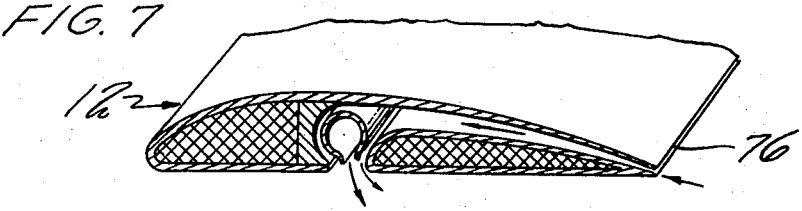
FIg. 7 is another view similar to FIG. 5 showing another alternative jet flap construction.

Referring now to FIG. 7, another alternative blade construction is shown. The blade construction of FIG. 7 differs from that of FIG. 5 only in that the upper and lower blade structure is arranged so that opening 76 is positioned at the trailing edge rather than at the top or bottom near the trailing edge as in FIGS. 5 and 6, respectively.

The arrows shown in FIGS. 5, 6 and 7 depict the flow of air as it is discharged from the jet pump and also as it is drawn through the opening 76 and then flows through space 70 and opening 64. The blade configuration shown in FIG. 5 is preferred for a helicopter rotor jet flap configuration, but the arrangements shown in FIGS. 6 and 7 may also be used.

Figure 10:
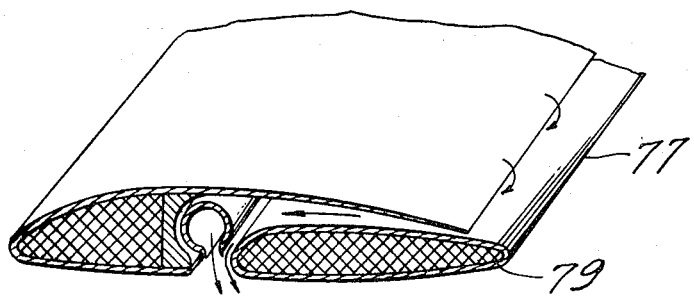
FIG. 10 is a view similar to FIG. 5 showing another alternative jet flap construction.

As shown in FIG. 10, it may be desirable to vary the shape of the trailing edge of the blade 10 from a sharp edge 77 along the outboard portion (i.e. removed from the hub) to a rounded edge 79 along the inboard portion (i.e. near the hub) to keep the airflow attached to the blade in the reverse flow region and thus eliminate negative lift and high drag usually present in the reverse flow region of the retreating blade and thereby promote positive lift by continuing to discharge air drawn through the jet flap structure.

Figure 9:
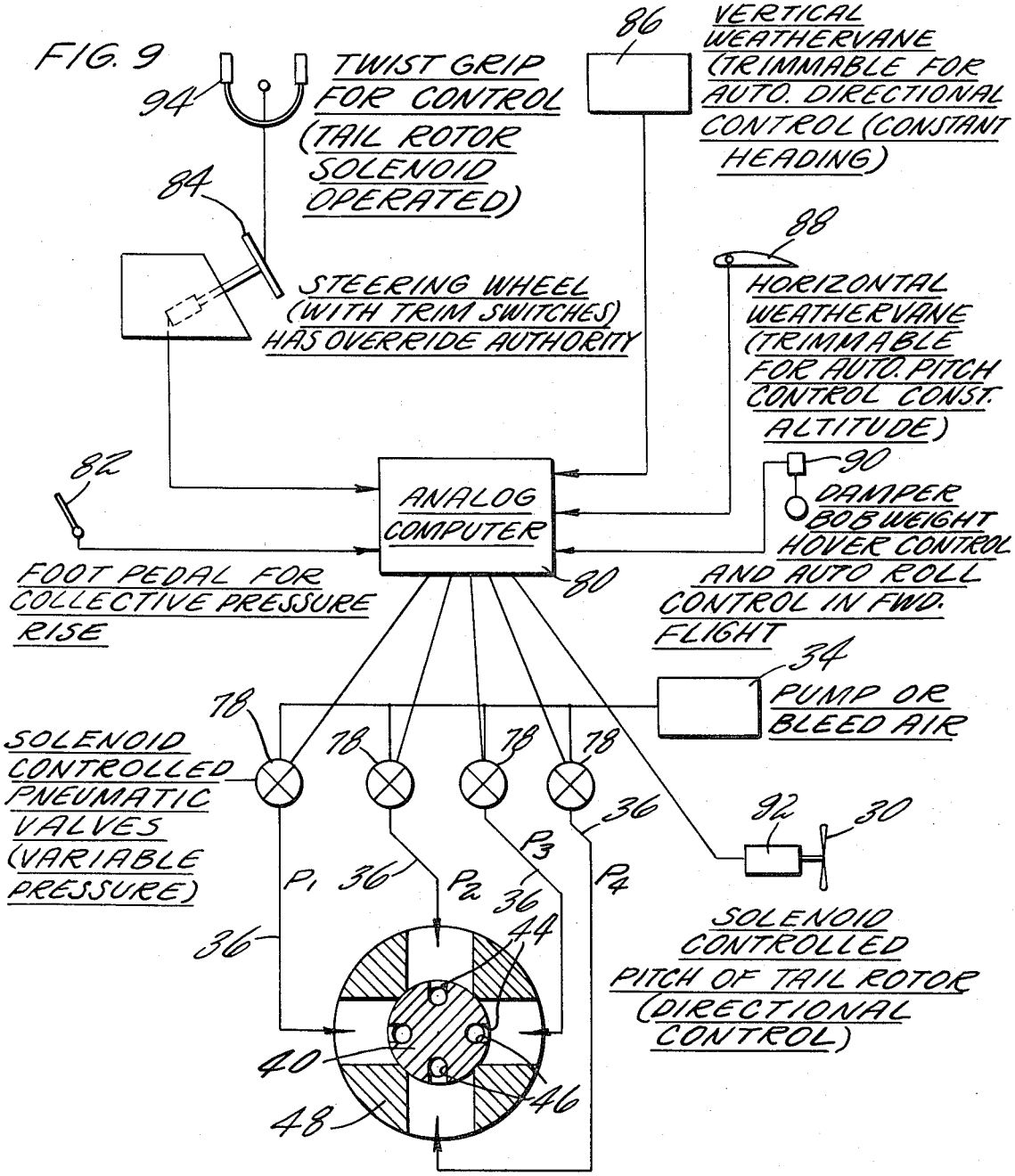
FIG. 9 is a schematic representation of a typical control system suitable for use in the present invention.

Referring now to FIG. 9, a schematic control system is shown for the counterflow jet flap rotor blades. Solenoid controlled pneumatic valves 78 are positioned in each of the supply lines 36 to provide variable pressure supplies to casing 48 and thus to the inlets 44 and passages 46. The solenoid controlled pneumatic valves 78 are programmed by an analogue computer 80 which receives a collective input signal from foot pedal 82 and a cyclic pitch input signal from steering wheel 84. The collective pitch input signal to computer 80 results in a computer output to uniformly modify the settings of all of the valves 78 to provide a constant change in the air pressure being delivered to the jet pumps 66 via the passages 46. Thus, although shaft 40 is rotating to bring the passages 46 and the jet pumps 66 into serial communication with the flow supply lines 36, the airflow change through the jet pumps, and thus the total induced airflow through ejector action (i.e. through opening 76, space 70 and opening 64), will be uniformly changed from the previous level for all of the rotor blades.

Assuming now that a change comparable to a cyclic pitch change is desired to effect a change in direction of flight, steering wheel 84 is moved commensurate with the desired change. The movement of steering wheel 84 delivers a commensurate signal to analogue computer 80 which in turn delivers signals of different intensity to the solenoids associated with the several pneumatic valves 78. The different signals result in unequal changes in the settings of the valves 78 so that the air pressures delivered to the inlets 44 associated with the respective valves 78 differ by amounts commensurate with the differences in the settings of the valves 78. The different air pressures thus flowing to the jet pumps cause different amounts of ejector action at each of the rotor blades, and thus the loading of the blades is unbalanced in a manner similar to and producing the effect of cyclic pitch changes in the blades. It will be noted that all of the different pressure levels as determined by the settings on valves 78 are delivered in series to each of the passages 46 and thus to each of the jet pumps 66 as shaft 40 rotates to bring the passages 46 into successive communication with the different supply liens 36. Thus, the pressure loading on each rotor blade resulting from jet pump action varies in a predetermined manner as the blades travel around the rotor axis. A variable blade loading commensurate with cyclic pitch changes is thus accomplished without actually pivoting the blade. In this manner, all hinge connections between the blades 12 and the hub 14 are eliminated to produce an optimum rigid rotor configuration in which the blades are directly connected to the hub.

Continuing with the description of the example of a control configuration as shown in FIG. 9, control signals are also delivered to analogue computer 80 from a vertical weather vane 86 which may be trimable for automatic directional control to provide constant headings, and a horizontal weather vane 88 which may be trimable for automatic pitch control to provide constant attitude settings. A damper bob weight hover control 90 is also connected to deliver signals to analogue computer 80 for automatic hover stabilization and forward flight roll stabilization. The signals from weather vane 88 and damper 90 are received by computer 80 and are used to modulate the settings of valves 78 to vary the pressure in lines 36. Signals from weather vane 86 are received by computer 80 and are delivered to a solenoid control 92 for tail rotor 30. Twist grips 94 may form a part of steering wheel 84 (the steering wheel being duplicated in an upper left corner of FIG. 9 for the purpose of schematically showing the twist grips), and signals from the twist grips are delivered to analogue computer 80 and then to solenoid control mechanism 92 to regulate the pitch of tail rotor 30.

As can be seen from the foregoing description, a large part of the lift force on the rotor blades and the force distributions for directional movement are generated by the reaction between the total airflow discharged through openings 64 and the rotor blades. The need for hinge connections between the blades and the rotor head is thus eliminated.

Figure 8:
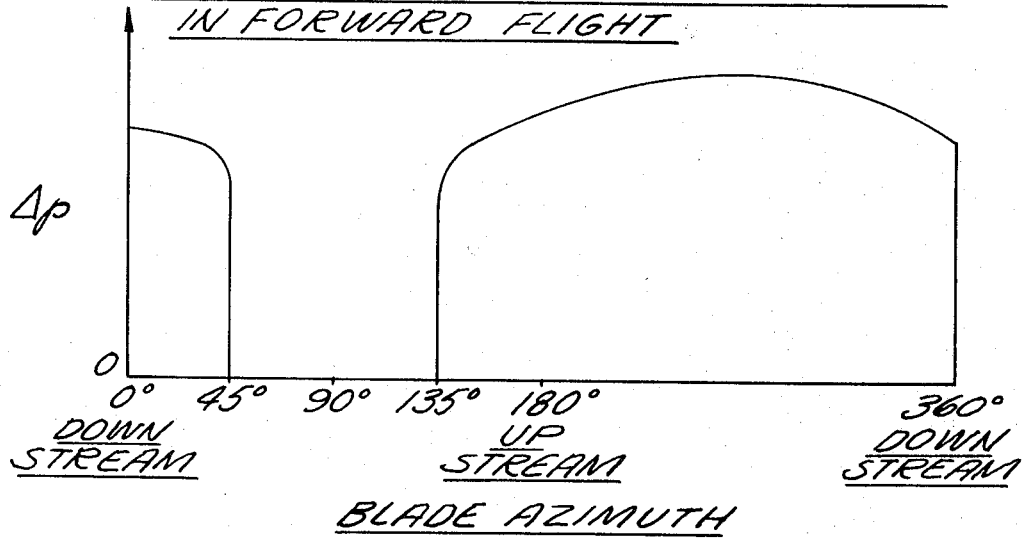
FIG. 8 is a chart showing optimum jet pump pressure distribution around the rotor azimuth in forward flight.

It will be apparent that vertical lift can be generated by an equal loading of the blades resulting from the delivery of jet pump air at equal pressure to each of the jet pumps in the rotor blades. Directional flight can then be accomplished by varying the pressure distribution to each blade as the blade rotates around the rotor azimuth. By way of example, FIG. 8 shows an optimum jet pump pressure distribution as the blade travels around the rotor axis to produce forward flight. That is, FIG. 8 shows the way in which the pressure to each jet pump should be varied ideally as the blades rotate about the rotor axis to produce forward flight. The abscissa of the chart of FIG. 8 represents the azimuth position of a rotor blade, and the ordinate represents the pressure change to be effected in the air supply being delivered to the jet pump in that blade to accomplish forward flight. It will be apparent that other directional movements can be realized by variations in this pressure loading.

The helicopter of the present invention with counterflow jet flap rotor blading is an exceptionally efficient and versatile craft, especially for small helicopter embodiments, and most especially in the size range suitable for from two to six people. The simple construction of the rotor head greatly simplifies the flying of the craft. The operational noise level is reduced significantly below the level heretofore involved with any helicopter, and the craft can be built and operated economically. Extremely good operational versatility is achieved in that the craft can travel on an air cushion over water and roads for ultimate range and payload; it can travel in ground effect over rough terrain for ultimate range, altitude and payload, while traveling out of ground effect for maximum maneuverability; and the inflatable rubber boot on the shroud allows for water landing and takeoff while snap-on skids can be employed for rough terrain landings. While all of the foregoing discussion has been directed to a single rotor craft, it will be understood that all of the same principles can be employed in a coaxial rotor or any other multiple rotor configuration with separate jet pump installations and controls for each rotor. Also, rotor blades incorporating the present invention could be mounted above the craft.

While a preferred embodiment has been shown and described, various modifications and substitutions may be made without departing from the spirit and scope of this invention. Accordingly, it is to be understood that this invention has been described by way of illustration rather than limitation.

I claim:

1. a helicopter including:
   a fuselage;
   a rotor shaft rotatably mounted on said fuselage;
   engine means drivingly connected to said rotor shaft;
   a plurality of rotor blades connected to said rotor shaft;
   counterflow jet flap means mounted in the rear of each of said rotor blades;
   jet pump means mounted in each of said rotor blades, each jet pump means communicating with the jet flap means in the rotor blade to draw air into the rotor blade from the rear of the blade;
   a discharge opening in the lower surface of each of said rotor blades, said discharge opening being aligned with the jet pump means in the rotor blade and said discharge opening communicating with the counterflow jet flap in the rotor blade, each of said ejector pumps discharging to atmosphere through said discharge opening in the rotor blade and inducing a flow of air through the counterflow jet flap, said induced flow of air also discharging through the discharge opening;
   a plurality of supply passages in said rotor shaft communicating with said jet pumps;
   pressurized gas supply means;
   a plurality of gas supply conduits connected at one end to said gas supply and connected at the other end to said supply passages in said rotor shaft, said rotor supply passages being serially connected to each of said gas supply conduits as said shaft rotates to deliver pressurized gas to said jet pumps serially from said gas supply conduits; and
   independently variable valve means in each of said gas supply conduits for regulating the pressure of air delivered through each of said gas supply conduits to regulate jet pump discharge and induced flow from the counterflow jet flap through said discharge opening in each rotor blade to load said rotor blades commensurate with a desired mode of helicopter operation.

2. A helicopter as in claim 1 wherein:
   said ejector pumps discharge and said induced flow discharge load said rotor blades commensurate with a desired mode of helicopter operation; and wherein
   said control means is operative to change the loading on said rotor blades to vary the mode of helicopter operation.

3. A helicopter as in claim 2 wherein: the change in mode of helicopter operation is commensurate with a change in collective pitch.

4. A helicopter as in claim 2 wherein: the change in mode of helicopter operation is commensurate with a change in cyclic pitch.

5. A helicopter as in claim 1 wherein: said rotor blades are rigidly connected to said rotor shaft.

6. A helicopter as in claim 1 wherein: said rotor blades are below the center of gravity of said fuselage.

7. A helicopter as in claim 1 wherein: said counterflow jet flap in each rotor blade includes an opening in the upper surface of the blade and a passageway to the discharge opening in the lower surface of the rotor blade.

8. A helicopter as in claim 1 wherein: each of said passages in said rotor shaft is connected to a corresponding ejector pump in a rotor blade, and wherein said control means includes a plurality of pneumatic valves, each of said valves being connected to control the pressure of gas supplied to at least one of said passages.

9. A helicopter as in claim 8 wherein: an equal change in the setting of each of said valves effects a change in helicopter operation commensurate with a change in collective pitch.

10. A helicopter as in claim 8 wherein: an unequal change in the setting of each of said valves effects a change in helicopter operation commensurate with a change in cyclic pitch.

11. A helicopter as in claim 1 wherein: the shape of the trailing edge of each rotor blade varies along its length, the blades having a rounded trailing edge adjacent the rotor shaft and a narrow edge adjacent the outboard end.